United States Patent [19]

Binkley

[11] Patent Number: 4,540,929
[45] Date of Patent: Sep. 10, 1985

[54] BATTERY RECHARGER

[75] Inventor: Bruce I. Binkley, Seattle, Wash.

[73] Assignee: Energy Exchange Systems, Seattle, Wash.

[21] Appl. No.: 580,618

[22] Filed: Feb. 16, 1984

[51] Int. Cl.³ .............................................. H02J 7/00
[52] U.S. Cl. ........................................ 320/2; 320/7; 320/16
[58] Field of Search .................. 322/1; 320/2, 35, 39, 320/48, 61, 7, 16

[56] References Cited

U.S. PATENT DOCUMENTS

| | | | |
|---|---|---|---|
| 2,044,917 | 6/1936 | Richardson | 307/10 R |
| 3,309,598 | 3/1967 | Montgomery et al. | 320/2 |
| 3,463,995 | 8/1969 | Herold | 320/6 |
| 3,504,262 | 3/1970 | Sada et al. | 320/6 |
| 3,534,354 | 10/1970 | Galginaitis | 320/48 X |
| 3,694,729 | 9/1972 | Jones | 307/150 |
| 3,763,415 | 10/1973 | Ownby | 320/6 |
| 3,896,364 | 7/1975 | Reister | 320/2 |
| 3,949,289 | 4/1976 | Day | 320/6 |
| 4,004,208 | 1/1977 | Tamminen | 320/2 |
| 4,006,397 | 2/1977 | Cototti et al. | 320/35 X |
| 4,069,451 | 1/1978 | Rouse | 322/1 |
| 4,092,580 | 5/1978 | Prinsze | 320/2 |
| 4,258,305 | 3/1981 | Anglin | 320/2 |
| 4,264,855 | 4/1981 | Ghilbaudo et al. | 320/6 |
| 4,398,139 | 8/1983 | Prinsze | 320/2 |

Primary Examiner—R. J. Hickey
Attorney, Agent, or Firm—Seed and Berry

[57] ABSTRACT

A rechargeable emergency battery charging device for starter motor storage batteries. The device includes a plurality of rechargeable nickel-cadmium or sealed lead cells. A first circuit is provided which couples the cells in series for charging the storage battery and a second circuit couples the cells in parallel so they may be recharged from the storage battery. A switch means interconnects the two circuits. Charging and recharging current flow is regulated, and circuit functions are indicated by light-emitting diodes, and by a galvanometer. The device is provided with connecting means to couple it to an automobile storage battery via the cigarette lighter, or directly to the battery terminals. A further connector is provided for recharging the device from an AC source.

16 Claims, 4 Drawing Figures

BATTERY RECHARGER

BACKGROUND OF THE INVENTION

1. Field of the Invention

This invention relates generally to a battery charger, and more particularly to a self-contained emergency battery charger for motors having a starter battery and an alternator or generator.

2. Description of the Prior Art

A motor vehicle storage battery frequently falls into a state of discharge such that it cannot deliver sufficient current to the starter motor. This occurs most commonly due to excessive current drain, insufficient charging time and severe environmental conditions.

To start a vehicle whose storage battery has run down requires either bypassing the electrical starting system entirely, or supplying the system with an additional source of electrical power. The former is generally accomplished by push-starting the vehicle; the latter by using jumper cables. Push starting requires assistance in the form of a push vehicle or muscle power. Additionally, only cars fitted with standard transmissions can be push started. Jump starting also requires the aid of an additional vehicle. Further, cables must be available and must be externally connected, requiring the user to exit the vehicle, and be exposed to the hazards of a possible battery explosion and associated mishaps as a result of misconnection.

Several self-contained means for charging a vehicle's inoperative battery to enable the vehicle to start have been developed. U.S. Pat. No. 4,004,208 issued to Tamminen discloses a starting aid which may be contained within a vehicle to provide an emergency power source. This starting aid is not itself readily rechargeable and requires approximately fifteen hours to recharge with the vehicle's engine running. This is because the additional voltage supplied by the vehicle's alternator or generator is required to recharge the charging aid batteries. Because of this very slight voltage differential, no fast charge mode is possible in the invention of Tamminen.

Other devices are known in the art including those disclosed in U.S. Pat. No. 3,504,262 issued to Sada et al, U.S. Pat. No. 4,258,305 issued to Anglin and U.S. Pat. No. 3,763,415 issued to Ownby. These all require either a connection to an external power source, or are insufficiently portable or require extensive charging and/or recharging time.

SUMMARY OF THE INVENTION

It is therefore an object of the present invention to provide an emergency charger for a starter motor battery.

It is another object to provide a charger which is inexpensive, and is safe and simple to operate.

It is another object to provide a battery charger which is totally self-contained.

It is a further object to provide an emergency charger which can itself be easily recharged from either an AC or DC power source in a relatively short time.

Briefly, a preferred embodiment includes two battery packs of nickel-cadmium batteries, each pack delivering about eight volts and capable of delivering up to fifty amps of current. Two circuits are provided, a first which connects the battery packs in series to deliver the charging current to the vehicle storage battery, and a second circuit which connects the battery packs in parallel to allow for their recharge from the vehicle alternator/generator, battery or AC source. Each circuit includes resistors in series with the battery packs to maintain the electrical current delivered to or from them at the desired level. A double-throw switch interconnects the two circuits and allows selection of either the charging mode or the recharging mode. A gauge showing the amount of charging current is connected into the series circuit. The charger itself is connected to the vehicle battery through a cigarette lighter plug or by clips for direct connection to the vehicle battery. An adapter is included, allowing for recharge of the battery packs from AC line current.

An advantage of the present invention is that it enables a starter battery which has been discharged to be charged enough in a few minutes to start.

Another advantage of the present invention is that there is no requirement of an outside power source when charging a vehicle's discharged battery.

It is another advantage of the present invention that the unit is compact in size and weight.

Another advantage of the present invention is that it is simple and safe to operate, and can be used with practically any starter battery.

Another advantage of the present invention is that it is portable and may be utilized in a vehicle without the user having to exit the vehicle.

It is a further advantage of the present invention that it can be recharged from an AC source and by DC from the vehicle's battery without running the engine.

Another advantage of the present invention is that it includes indicator means for keeping the user informed of its functions.

These and other objects and advantages of the present invention will no doubt become apparent to those skilled in the art after having read the following detailed description of the preferred embodiment which is illustrated in the various drawing figures.

IN THE DRAWINGS

DETAILED DESCRIPTION OF THE PREFERRED EMBODIMENT

Figure 1:
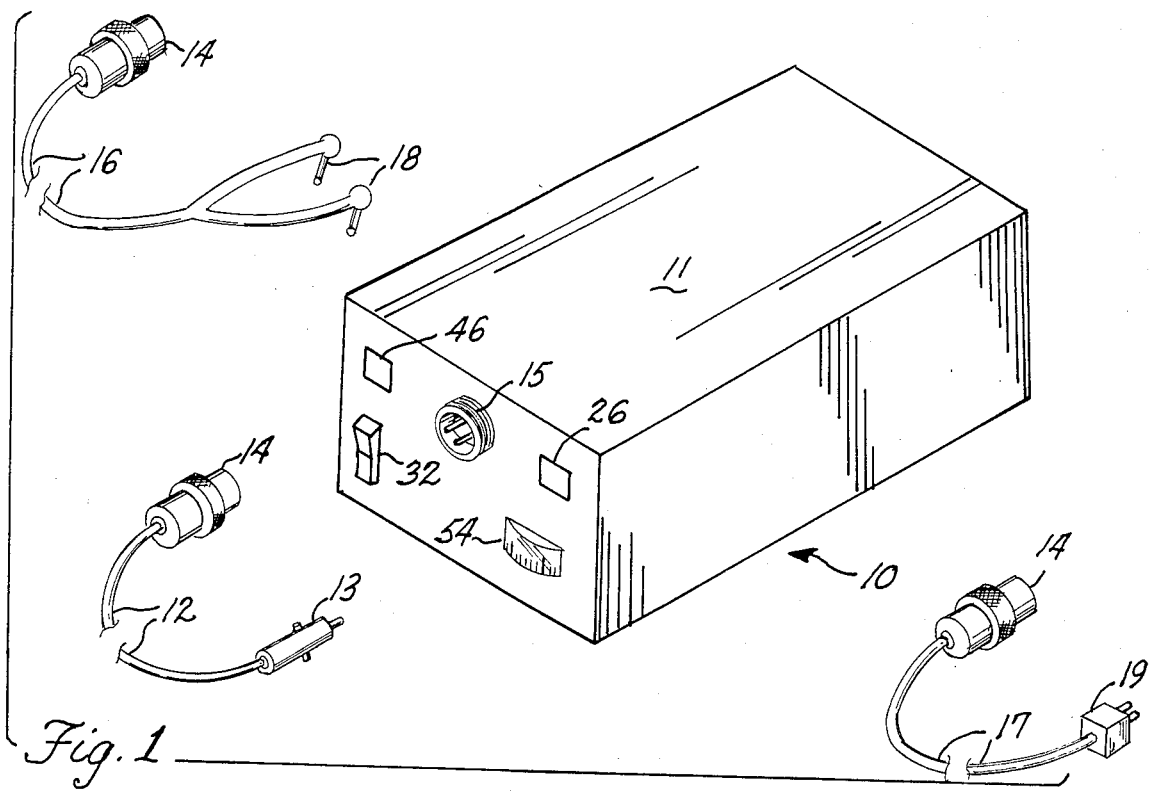
FIG. 1 is a perspective view of the battery charger showing its physical configuration.

FIG. 1 illustrates a battery charger of the present invention and referred to by the general reference character 10. The charger 10 is enclosed in a metal or plastic housing 11 which measures approximately six inches by two inches by three inches. A cable 12 is used to connect the charger 10 to a vehicle cigarette lighter, and has a plug 13 at one end for fitting thereinto, and a three terminal general purpose plug 14 at the opposite end for mating with a jack 15 formed into the housing 11. A second cable 16 and a third cable 17 are provided to allow the charger 10 to be connected directly to a vehicle battery, and to an AC power source, respectively. Both cables 16 and 17 include at one end the three-terminal general purpose plug 14 for mating with the jack 15. The cable 16 includes at its other end a pair of alligator-type clips 18 for attaching to the posts of a vehicle battery. The cable 17 includes at its other end an AC adaptor 19 which may be inserted into a standard household electrical outlet.

Figure 2:
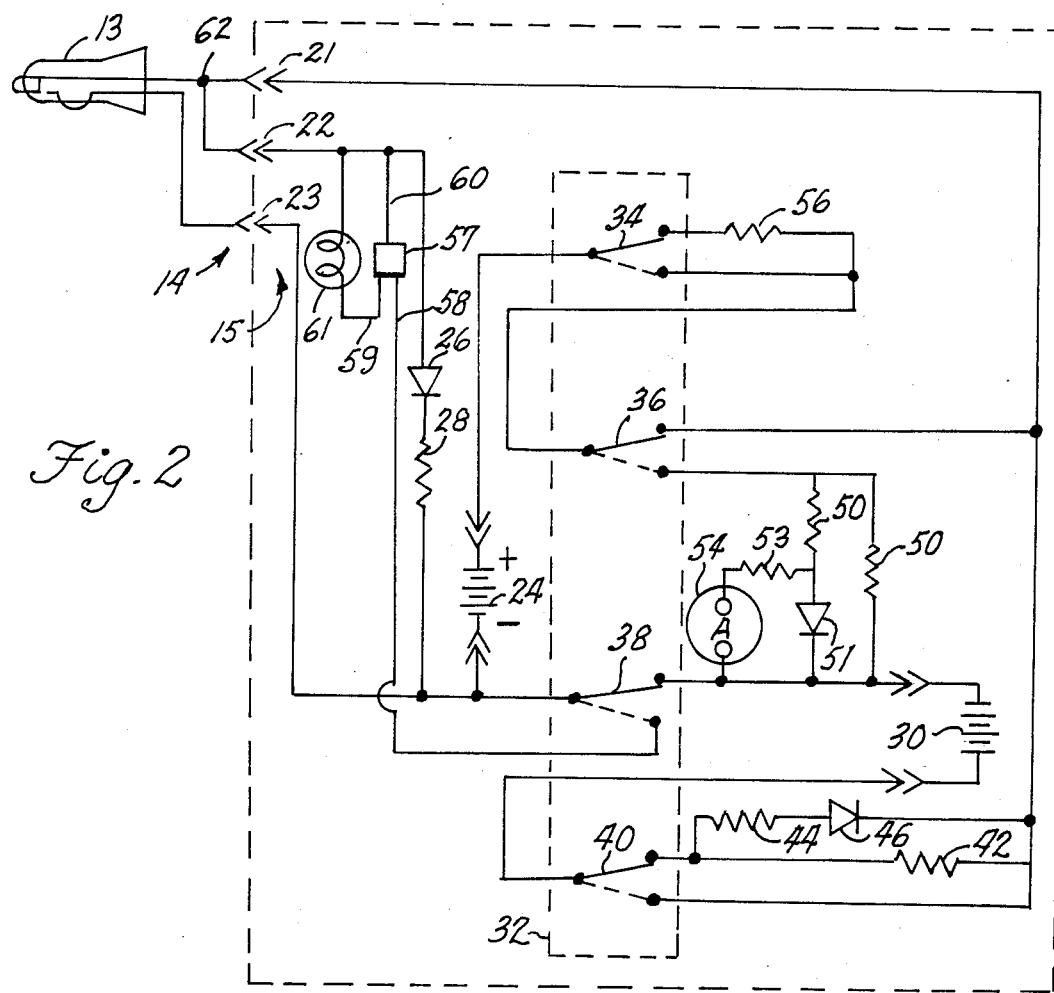
FIG. 2 is a schematic circuit diagram of the battery charger of the present invention.

A schematic circuit diagram of the charger 10 is illustated in FIG. 2 and shows the components within the housing 11 bounded by a dashed line. The three terminal general purpose jack 15 contains a first terminal 21, a second terminal 22, and a third terminal 23. A first battery pack 24 comprising seven rechargeable nickel-cadmium batteries, is connected at its negative terminal to the terminal 23 of the jack 15. In series with the battery pack 24 and the terminal 22 is a light emitting diode (LED) 26 and a resistor 28, connected to the anode of the LED 26.

A second battery pack 30, also comprising seven nickel-cadmium batteries is connected to the first battery pack 24 by a first series circuit and by a second, parallel circuit. A four-pole, double-throw switch 32 enables switching between the two circuits and contains a first, a second, a third and a fourth pole 34, 36, 38 and 40.

The positive terminal of the battery pack 30 is connected, through the pole 40 of the switch 32, to the terminal 21 of the plug 15. With the switch 32 in the series mode, illustrated by the dashed line position, the positive terminal of the battery pack 30 is directly connected to the terminal 21. With the switch 32 in the parallel mode a resistor 42 is in series between the battery 30 and the terminal 21. Also in this circuit is a resistor 44, connected to an anode of a LED 46, both of which are in parallel with the resistor 42. The negative terminal of the battery 30 is connected to the negative terminal of battery 24, through pole 38, when the switch 32 is in the parallel mode. With the switch 32 in the series mode, a resistor 50 is in parallel with a diode 51, with a resistor 52 in series. Also, parallel with diode 51 is a resistor 53 in series with a galvanometer 54. These components are connected to the positive terminal of the battery 24 through the pole 36 of the switch 32, when in the series mode. The final pole 34 of the switch 32 interposes a resistor 56 in series with battery 24, in the parallel mode and bypasses the resistor 56 when in the series mode.

A negative five volt voltage regulator 57 is connected to the terminal 22 of the plug 15 and includes an input lead 58, an output lead 59 and a ground lead 60. The input lead 58 is wired to the series pole 38 of the switch 32 and receives a negative input from the battery 24 when the switch 32 is in series mode. The ground lead 60 is wired to the terminal 22, and the output lead 59 is connected to one terminal of a five volt light bulb 61. The other terminal of the bulb 61 is also wired to the terminal 22 of the plug 15. The bulb 61 is positioned within the housing 11 near to the galvanometer 54 to illuminate it.

The plug 14 which plugs into the jack 15 includes a connection 62 across the terminals 21 and 22, connecting both of these to the positive contact of the cigarette lighter plug 13 or the clips 18. The other contact of the plug 13 or the clips 18 is wired to the remaining terminal 23 of the plug 14.

The battery packs 24 and 30 each comprise seven nickel-cadmium batteries of one and two-tenths (1.2) volts and have a rated capacity of one and four-tenths 1.4 ampere-hours (Ah) each. Such batteries are preferably of a type manufactured by GE Corp. carrying the part number K01XIIICS. The resistor values utilized in the preferred embodiment are as follows, although other value combinations may be used: Resistors 28 and 42 are three hundred and ninety ohms, resistors 44 and 56 are twenty-seven ohms, resistor 52 is one-half an ohm, resistor 50 is 2.2K ohms and resistor 53 is 1K ohms.

Operation of the charger 10 as follows. With the plug 14 inserted into the jack 15, the terminals 21 and 22 are connected by the coupling 62. This conducts the positive potential of terminal 21, through terminal 22, into the anode of the LED 26. The LED 26 will light, indicating that the power is on and the charger 10 is ready to charge a discharged storage battery. Simultaneously, the positive potential of terminal 21 will reach the ground 60 of the voltage regulator 57. The switch 32 is placed in the series or "output" position, which causes the battery packs 24 and 30 to be connected in series. This enables the negative input from the switch element 38 to reach the input 58 of the voltage regulator 57. The light bulb 61 will light, illuminating the face of the galvanometer 54.

In this mode, the resistor 50 restricts the flow of charging current delivered to the vehicle battery to about five amps. The combined nominal voltage between the battery packs 24 and 30 in series is about sixteen and eight-tenths (16.8) volts. The nominal voltage of the vehicle battery is twelve volts. The four and eight-tenths (4.8) volt difference becomes a voltage drop on resistor 50, thus allowing current to flow from the battery packs 24 and 30 to the vehicle's storage battery. The needle of the galvanometer 54 will indicate the presence of this current flow by moving to the right during charging. The galvanometer 54 is responsive to the voltage drop on the diode 51 which is a drop of approximately six-tenths (0.6) volts. The needle of the galvanometer will remain in a constant position as long as the voltage drop on the resistor 50 is higher than six-tenths (0.6) volts. This method eliminates the effects of any sudden voltage drop fluctuations of the resistor 50 on the galvanometer 54 when charging a deeply discharged vehicle battery.

As current flows from the battery packs 24 and 30 into the vehicle battery, the needle of the galvanometer 54 will remain to the right. When the charging current drops to approximately one and five-tenths (1.5) amperes, the voltage drop on the resistor 50 will approximate the voltage drop on the diode 51. A voltage drop of below six-tenths (0.6) volts on the resistor 50 will cause a similar drop on the diode 51, thus causing the needle of the galvanometer 54 to gradually move to the left, reaching the far left when the current value of the battery packs 24 and 30 is about one-half ampere. This indicates a sharp decrease in the charging capability of the recharger 10, and typically occurs after about forty-five minutes of charging. Battery packs 24 and 30 together are capable of delivering about 5040 ampere seconds of current. A standard twelve volt vehicle starter requires from one hundred to six hundred ampere seconds, depending on vehicle size, type and condition, to turn the engine. In most cases, therefore, the vehicle battery will be recharged after only five minutes.

At this point the vehicle may be started. The charger 10 may be recharged by direct current from the vehicle's battery. The vehicle's engine does not have to be running to accomplish this. The switch 32 is switched to the input position, bringing the parallel circuit into play. In this position, the nominal voltage across the battery packs 24 and 30 is eight and four-tenths (8.4) volts. The twelve volt vehicle battery will thus recharge the battery packs with a voltage drop of about three and six-tenths (3.6) volts. With the vehicle's engine running, an additional two volts supplied by the alternator or generator will increase this to about five and six-tenths (5.6) volts. The difference of voltage between the vehicle battery and the battery pack 24 will drop on the resistor 56, while the voltage difference between the vehicle battery and the battery pack 30 will drop on resistor 42. During recharge, the LED 46 will light, indicating that recharging of the battery packs 24 and 30 is occurring. To avoid overcharge, the resistors 42 and 56 restrict the rate of recharge to a value which is approximately one-tenth of the battery's rated value. This is about one hundred and forty milliamps for the one and four-tenths (1.4) amp-hour batteries 24 and 30. Recharge time is dependent on the degree to which charging current was drawn from the battery packs 24 and 30. Typically, total recharge of the battery packs 24 and 30 will occur in about fourteen to sixteen hours. It is not critical to ascertain this point, however, as the recharge mode is a trickle charge which cannot overcharge the battery packs 24 and 30.

An alternative to DC recharging from the vehicle battery is to use AC household current, supplied to the recharger 10 through the AC adapter 19 and cable 17. The adapter 19 does not include a connector 62, thus the terminals 21 and 22 are not connected and the LED 26 will not light. In all other respects, recharging of the battery packs 24 and 30 is identical to the DC recharge method.

When recharge is completed, the cable 12 or 17 is disconnected from the charger 10 and the charger and cable stowed for future use.

Figure 3:
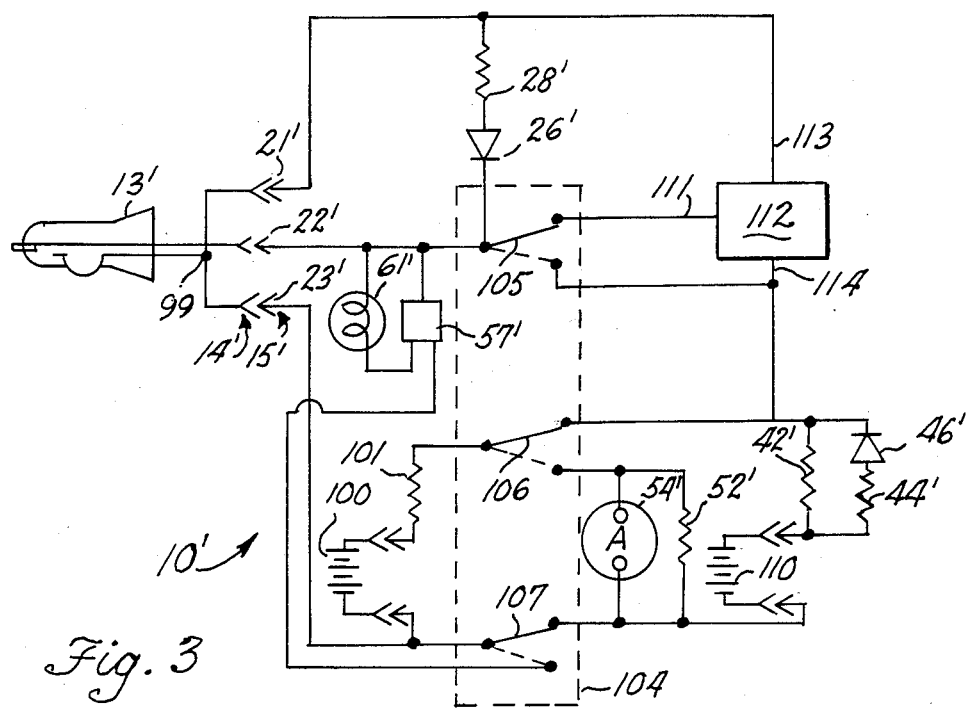
FIG. 3 is a schematic circuit diagram of an alternative embodiment of the present invention.

An alternative embodiment of the present invention is illustrated in schematic in FIG. 3 and designated by the general reference character 10'. This circuit employs eight sealed lead cells rather than fourteen nickle-cadmium cells. This provides a cost advantage over the preferred embodiment. These cells may be of a type manufactured by GE Corp and carrying the part number 47B025AA01001. The elements of the alternative embodiment 10' which are common to those of the preferred embodiment carry the same reference numeral distinguished by a prime 10' designation. The alternative embodiment includes a cigarette lighter plug 13' coupled to a three-terminal general purpose type plug 14'. A three terminal jack 15' has a first terminal 21', a second terminal 22' and a third terminal 23'. The plug 14' does not include the connection 62 of the preferred embodiment. Instead, a connection 99 couples the terminals 21' and 23' to one contact of the plug 13', while the other contact of the plug 13' is wired to the remaining terminal 22'. Terminal 23' is connected to a negative terminal of a first lead acid battery pack 100. The positive terminal of battery pack 100 is connected to a resistor 101 and the positive terminal of the battery pack 110 is connected to a resistor 42'. A three pole, double throw switch 104 is provided which switches the circuitry of the recharger 10' from a parallel mode to series mode and vice versa. The switch 104 has a first pole 105, a second pole 106 and a third pole 107. With the switch 104 in the parallel mode indicated by the solid line position, the resistor 101, in series with the battery 100, are connected in parallel with the resistor 42' which is in series with the battery pack 110, via elements 106 and 107 of the switch 104. Parallel to resistor 42' is a resistor 44', wired to an anode of a LED 46'. In the parallel circuit, a negative terminal of the battery pack 110 is connected, via pole 107 of the switch 104 to a negative terminal of battery pack 100. The terminal 22' of the jack 15' is connected, when the switch 104 is in the parallel mode, with an input lead 111 to a voltage regulator 112, through the first terminal 105. The voltage regulator 112 further includes a ground lead 113 and an output lead 114. The ground lead 113 is connected to the first terminal 21' of the jack 15' and the output lead 114 is connected to the cathode of the LED 46' and through the resistor 42' to the positive terminal of battery 110. Output lead 114 is further connected through the pole 106 of switch 104 and a resistor 101 to the positive terminal of the battery 100. The voltage regulator 112 is responsive to the ambient air temperature for a proper recharge voltage level setting, and provides a constant voltage recharge to the battery packs 100 and 110, thus eliminating any possibility of overcharging them. Coupled across terminals 21' and 22' of the jack 15' and in series with each other are a LED 26' and a resistor 28', wired to the LED 26''s anode. With the switch 104 in the series position, illustrated by the dashed lines, the voltage regulator 112 is bypassed, and a galvanometer 54' and a resistor 53' are brought into the circuit. These components are parallel with each other, and are wired in series with the negative terminal of the battery pack 110, through the pole 106 of the switch 104, through resistor 101, to the positive terminal of the battery pack 100. Also included in the series circuit are a voltage regulator 57' and a lamp 61' wired to the battery 100 through the series terminal 107 of the switch 104, and to the terminal 22' of the jack 15'. The lamp 61' is positioned near to the galvanometer 54' and serves to illuminate it as in the preferred embodiment.

Operation of the charger 10' is as described relative to the charger 10 of the preferred embodiment.

Figure 4:
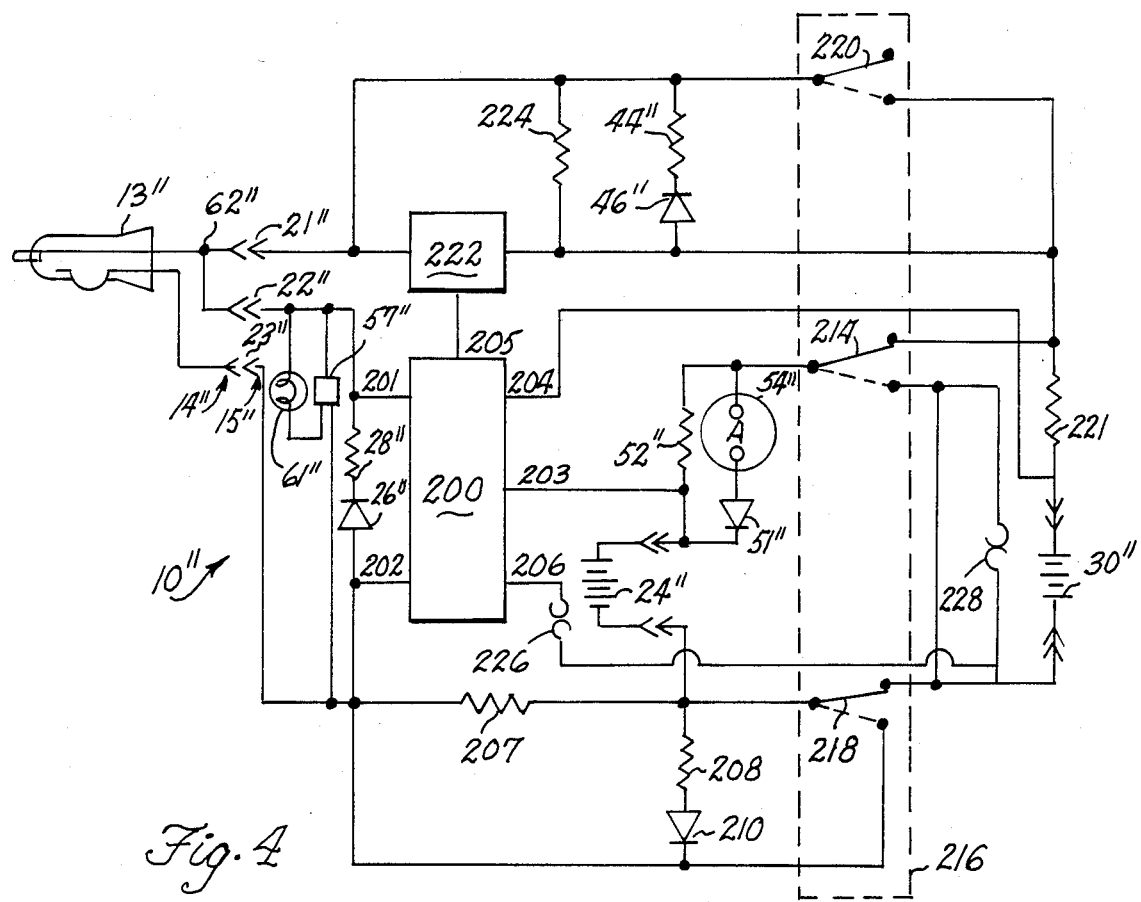
FIG. 4 is a schematic circuit diagram of a second alternative embodiment of the present invention.

A second alternative embodiment is illustrated in schematic in FIG. 4 and designated by the reference character 10". The charger includes a fast-recharging mode to supplement the trickle-charge mode of the preferred embodiment. These elements of this embodiment which are common to the preferred embodiment carry the same reference numeral distinguished by a double-prime designation. A control circuit 200 having a first pin 201, a second pin 202, a third pin 203, a fourth pin 204, a fifth pin 205 and a sixth pin 206 is coupled into the parallel recharging circuit and adapted for switching from the fast charge mode to the trickle charge mode at a preselected voltage. The control circuit 200 operates as known in the prior art. The pin 201 is connected to the terminal 22" of the jack 15". The pin 202 is connected to the terminal 23" of the jack 15". A resistor 28" is connected to a cathode of a LED 26" and wired across the pins 201 and 202. In series with a negative terminal of a battery 24" and the pin 202, and in parallel with each other are a resistor 207 and a resistor 208. Between the resistor 208 and the pin 202 is a LED 210, which is arrayed with its anode connected to the resistor 208, and its cathode connected to the pin 202. A positive terminal of the battery 24" is connected to the pin 203 and is further connected to a cathode of a diode 51" which is in turn connected to one terminal of a galvanometer 54". A resistor 52" provides a bypass around the diode 51" and galvanometer 54". The galvanometer 54" is connected to a first pole 214 of a three-pole double-throw switch 216. The switch 216 additionally has a second pole 218 and a third pole 220, and has a first or series position, illustrated by the dashed lines and a second or parallel position, illustrated by the solid lines. In the parallel circuit, the galvanometer 54" is connected, through the pole 214 to a resistor 221 which is in turn connected to a positive terminal of a second battery pack 30". Directly connected to the positive terminal of the battery pack 30" is a lead from the pin 204 of the control circuit 200. A negative terminal of the battery pack 30" is connected to the pole 218 of the switch 216 and is coupled to the negative terminal of the battery pack 24" when the switch 216 is in the parallel mode. The remaining terminal 21" of the jack 15" is coupled to the resistor 221 through the pole 220 of the switch 216 when in the series mode. Intermediate to the terminal 21" and the resistor 221 is a current switch 222 which is also connected to the pin 205 of the control circuit 200. The current switch 222 operates as known in the art. Bypassing the current switch is a resistor 224. A resistor 44" connected to a cathode of a LED 46" are wired in parallel with a bypass resistor 224. These components bypass the current switch 222 upon completion of the fast charge of battery packs 24" and 30". In the series mode, a shunt around the switch 222, resistors 224 and 44" and the LED 46" is made through the pole 220 of the switch 216. Also included in the series circuit are the voltage regulator 57" coupled to the lamp 61". These components are wired to the negative terminal of the battery pack 24" and to the terminal 22" of the jack 15". The lamp 61" is positioned to provide illumination for the galvanometer 54". A pair of thermostats 226 and 228 are wired in series and are connected to the remaining pin 206 of the control circuit 200, and through the remaining pole 218 of the switch 216 when in the parallel mode, through the resistor 207 to the pin 202.

The circuit operates essentially as described in the preferred embodiment. The battery packs 24" and 30" are supplied with current through the resistors 52" and 22", respectively. Additionally, current will flow to the battery packs 24" and 30" through the resistor 207, resulting in a fast charge mode. In this mode the LED 210 will light as long as sufficient recharging current is flowing through the resistor 207. The control circuit samples the voltage across the terminals of the battery packs 24" and 30" and compares it with a preselected value. For the eight and four-tenths (8.4) volt battery packs 24" and 30", this value is about ten and five-tenths (10.5) volts. When this value is reached the control circuit 200 electronically shuts off current flowing through the current switch 222. The current continues to flow in a trickle charge mode, however, through the bypass resistor 224. This voltage drop on resistor 224 is sufficient to cause the LED 46" to light, indicating the trickle charge mode. The decreased voltage drop on the resistor 207 causes the LED 210 to go out, signalling the fast charge mode has ceased. The thermostats 226 and 228 are each placed in proximity to a battery pack 24" or 30". If the battery packs 24" or 30" give off excess heat before the voltage value reaches ten and five-tenths (10.5) volts, this excess heat will be sensed by one of the thermostats 226 or 228, which will then open. This, in turn, signals the control circuit 200 resulting in termination of the fast charge mode. The remaining elements of the embodiment 10" function as described for the preferred embodiment.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A starting aid for motors having a starter storage battery, comprising:
    at least first and second rechargeable batteries, said first and second batteries having a combined nominal voltage when connected in series greater than the voltage of the starter storage battery, and each having a nominal voltage substantially less than the nominal voltage of the starter storage battery, and said first and second batteries having a rated current output substantially smaller than the starter storage battery but sufficient to transfer enough charge to the starter storage battery to start the motor;
    a first circuit connecting said first and second batteries in series for charging the starter storage battery when in a discharged condition;
    a second circuit connecting said first and second batteries in parallel for recharging from the starter storage battery;
    a portable housing for enclosing said first and second batteries and said first and second circuits;
    switching means for selectively switching between said first and second circuits;
    connecting means for coupling said first and second circuits to the starter storage battery, whereby the starter storage batter, when in a discharged state, may be charged by said first and second batteries, and when in a charged state, may be used to recharge said first and second batteries with or without the motor being operated, said connecting means including a cable having a removable connector at an end thereof for connection to a connector mounted on said housing and a removable plug at an opposite end thereof for insertion into a vehicle cigarette lighter outlet to place the positive and negative terminals of the starter storage battery in electrical connection with said first and second circuits; and
    indicator means for indicating said removable connector is connected to said housing connector, whereby indication is provided to disconnect said cable and thereby remove electrical power from said removable plug to prevent accidental discharge of said first and second batteries by said plug contacting a conductive material during storage of the starting aid.

2. The starting aid of claim 1, further including at least one light-emitting diode in said second circuit for indicating the presence of current flowing therethrough for recharging said first and second batteries, and a galvanometer coupled to said first circuit for indicating charging current is flowing to the discharged starter storage battery.

3. A starting aid for motors having a starter storage battery, comprising:
    at least first and second rechargeable batteries, said first and second batteries having a combined nominal voltage when connected in series greater than the voltage of the starter storage battery, and each having a nominal voltage substantially less than the nominal voltage of the starter storage battery, and said first and second batteries having a rated current output substantially smaller than the starter storage battery but sufficient to transfer enough charge to the starter storage battery to start the motor, said first and second batteries each comprising seven 1.2-volt nickel cadmium cells;

a first circuit connecting said first and second batteries in series for charging the starter storage battery when in a discharged condition;

a second circuit connecting said first and second batteries in parallel for recharging from the starter storage battery;

switching means for selectively switching between said first and second circuits; and connecting means for coupling said first and second circuits to the starter storage battery, whereby the starter storage battery, when in a discharged state, may be charged by said first and second batteries, and when in a charged state, may be used to recharge said first and second batteries with or without the motor being operated.

4. A starting aid for motors having a starter storage battery, comprising:

at least first and second rechargeable batteries, said first and second batteries having a combined nominal voltage when connected in series greater than the voltage of the starter storage battery, and each having a nominal voltage substantially less than the nominal voltage of the starter storage battery, and said first and second batteries having a rated current output substantially smaller than the starter storage battery but sufficient to transfer enough charge to the starter storage battery to start the motor, said first and second batteries each comprising four 2.0 volt sealed lead cells, a first circuit connecting said first and second batteries in series for charging the starter storage battery when in a discharged condition;

a second circuit connecting said first and second batteries in parallel for recharging from the starter storage battery, and including a voltage regulator for supplying a constant and uniform recharging voltage to said first and second batteries;

switching means for selectively switching between said first and second circuits; and connecting means for coupling said first and second circuits to the starter storage battery, whereby the starter storage battery, when in a discharged state, may be charged by said first and second batteries, and when in a charged state, may be used to recharge said first and second batteries with or without the motor being operated.

5. A starting aid for motors having a starter storage battery, comprising:

at least first and second rechargeable batteries, said first and second batteries having a combined nominal voltage when connected in series greater than the voltage of the starter storage battery, and each having a nominal voltage substantially less than the nominal voltage of the starter storage battery, and said first and second batteries having a rated current output substantially smaller than the starter storage battery but sufficient to transfer enough charge to the starter storage battery to start the motor, said nominal voltage of each of said first and second batteries being about 8 volts, and said rated current output of said combined first and second batteries being about 5 amperes;

a first circuit connecting said first and second batteries in series for charging the starter storage battery when in a discharged condition;

a second circuit connecting said first and second batteries in parallel for recharging from the starter storage battery;

switching means for selectively switching between said first and second circuits; and connecting means for coupling said first and second circuits to the starter storage battery, whereby the starter storage battery, when in a discharged state, may be charged by said first and second batteries, and when in a charged state, may be used to recharge said first and second batteries with or without the motor being operated.

6. The starting aid of claim 5, further including means for connecting said second circuit with an external current source and recharging said first and second batteries therefrom.

7. The starting aid of claim 5 wherein said second circuit further includes means for restricting recharging current flow to said first and second batteries to a rate which is approximately one-tenth the rated output capacity of said first and second batteries.

8. The starting aid of claim 7 wherein said means for restricting recharging current flow includes a first resistive element in series with said first battery and a resistive element in series with said second battery.

9. The starting aid of claim 5 wherein said second circuit further includes means for restricting recharging current flow to each of said first and second batteries to a trickle charge, whereby said first and second batteries may be safely recharged for a prolonged time period.

10. A starting aid for motors having a starter storage battery, comprising:

at least first and second rechargeable batteries, said first and second batteries having a combined nominal voltage when connected in series greater than the voltage of the starter storage battery, and each having a nominal voltage substantially less than the nominal voltage of the starter storage battery, and said first and second batteries having a rated current output substantially smaller than the starter storage battery but sufficient to transfer enough charge to the starter storage battery to start the motor;

a first circuit connecting said first and second batteries in series for charging the starter storage battery when in a discharged condition;

a second circuit connecting said first and second batteries in parallel for recharging from the starter storage battery, including means for restricting recharging current flow to each of said first and second batteries to a trickle charge, whereby said fist and second batteries may be safely recharged for a prolonged time period, said means for restricting recharging current flow further providing means for protection of said first and second batteries from damage during recharging if said first and second batteries are at different voltages, whereby said first and second batteries will not undergo damage if at different voltages during operation by normal variations in operating voltage over time or by failure of one battery, producing a short circuit across the other battery;

switching means for selectively switching between said first and second circuits; and connecting means for coupling said first and second circuits to the starter storage battery, whereby the starter storage battery, when in a discharged state, may be charged by said first and second batteries, and when in a charged state, may be used to recharge said first and second batteries with or without the motor being operated.

11. The starting aid of claim 5 whrein said first circuit further includes means for restricting a charging current from said first and second batteries to a predetermined safe level, whereby dangerously large amounts of hydrogen gas will not be produced by the starter storage battery if of the type of battery which produces hydrogen gas when being charged by said first and second batteries.

12. A portable starting aid for motors having a starter storage battery, comprising:

at least first and second rechargeable batteries, said first and second batteries having a combined nominal voltage when connected in series greater than the voltage of the starter storage battery, and each having a nominal voltage sufficiently less than the nominal voltage of the starter storage battery to be recharged at least at a trickle charge rate by the starter storage battery without the motor being operated, and said first and second batteries having a rated current output substantially smaller than the starter storage battery but sufficient to transfer enough charge to the starter storage battery to start the motor;

a first circuit connecting said first and second batteries in series for charging the starter storage battery when in a discharged condition, said first circuit having means for restricting a charging current from said first and second batteries to a predetermined safe level;

a second circuit connecting said first and second batteries in parallel for recharging from the starter storage battery, said second circuit having means for restricting recharging current flow to each of said first and second batteries to a trickle charge and for protection of said first and second batteries from damage during recharge if said first and second batteries are at different voltages;

switching means for selectively switching between said first and second circuits, said switching means including a manually operable switch;

a portable housing for enclosing said first and second batteries and said first and second circuits, said manually operable switch being mounted for access externally of said housing;

at least one indicator means in each of said first and second circuits for indicating the functioning thereof; and connecting means for coupling said first and second circuits to the starter storage battery, said connecting means including a cable having a removable connector for connection to a connector mounted on said housing and a removable plug for insertion into a vehicle cigarette lighter outlet to place the positive and negative terminals of the starter storage battery in electrical connection with said first and second circuits, and including connection indicator means for indicating said removable connector is connected to said housing connector.

13. The starting aid of claim 12 wherein said nominal voltage of each of said first and second batteries is about 8 volts.

14. The starting aid of claim 12 wherein said removable connector and said housing connector each have first, have first, second and third mating contacts, said first contact connecting one terminal of the starter storage battery in electrical connection with the corresponding polarity terminal of said first and second circuits and said third contact connecting the other terminal of the starter storage battery in electrical connection with the corresponding polarity terminal of said first and second circuits, said first and second contacts of said removable connector being electrically interconnected, and said connection indicator means being connected between said second and third contacts of said housing connector, whereby when said removable connector is connected to said housing connector, voltage is applied across said connection indicator means to provide a positive indication when said removable connector is connected to said housing connector, but when disconnected, no voltage is applied across said connection indicator means.

15. A starting aid for motors having a starter storage battery, comprising:

at least first and second rechargeable batteries, said first and second batteries having a combined nominal voltage when connected in series greater than the voltage of the starter storage battery, and each having a nominal voltage sufficiently less than the nominal voltage of the starter storage battery to be recharged at least at a trickle charge rate by the starter storage battery without the motor being operated, and said first and second batteries having a rated current output substantially smaller than the starter storage battery but sufficient to transfer enough charge to the starter storage battery to start the motor, said nominal voltage of each of said first and second batteries being about 8 volts;

a first circuit connecting said first and second batteries in series for charging the starter storage battery when in a discharged condition, said first circuit having means for restricting a charging current from said first and second batteries to a predetermined safe level;

a second circuit connecting said first and second batteries in parallel for recharging from the starter storage battery, said second circuit having means for restricting recharging current flow to each of said first and second batteries to a trickle charge and for protection of said first and second batteries from damage during recharge if said first and second batteries are at different voltages;

switching means for selectively switching between said first and second circuits, said switching means including a manually operable switch; and connecting means for detachably coupling said first and second circuits to the starter storage battery, said connecting means including a cable having a removable plug for insertion into a vehicle cigarette lighter outlet to place the positive and negative terminals of the starter storage battery in electrical connection with said first and second circuits.

16. The starting aid of claim 15 wherein said means for restricting recharging current flow includes a first resistive element in series with said first battery and a resistive element in series with said second battery.

* * * * *

UNITED STATES PATENT AND TRADEMARK OFFICE
CERTIFICATE OF CORRECTION

PATENT NO.   : 4,540,929
DATED        : September 10, 1985
INVENTOR(S)  : Bruce I. Binkley It is certified that error appears in the above—identified patent and that said Letters Patent is hereby corrected as shown below:

Claim 1, line 32 delete the word "batter" and substitute the word --battery--.

[SEAL]

Signed and Sealed this

Seventeenth Day of December 1985

Attest:

Attesting Officer

DONALD J. QUIGG

Commissioner of Patents and Trademarks